United States Patent [19]

Satake et al.

[11] Patent Number: 5,380,783
[45] Date of Patent: Jan. 10, 1995

[54] POLY(ARYLENE SULFIDE) RESIN COMPOSITION

[75] Inventors: Yoshikatsu Satake; Toshihiko Ono; Yoshinobu Itoh; Yukio Ichikawa, all of Iwaki, Japan

[73] Assignee: Kureha Kagaku Kogyo K.K., Tokyo, Japan

[21] Appl. No.: 113,473

[22] Filed: Aug. 30, 1993

[30] Foreign Application Priority Data

Sep. 17, 1992 [JP] Japan .................. 4-273722
Mar. 26, 1993 [JP] Japan .................. 5-092206

[51] Int. Cl.⁶ .............................. C08K 3/10
[52] U.S. Cl. ..................... 524/406; 524/609
[58] Field of Search ................. 524/406, 609

[56] References Cited

U.S. PATENT DOCUMENTS

| | | | |
|---|---|---|---|
| 4,017,450 | 4/1977 | Bailey | 524/424 |
| 4,064,084 | 12/1977 | Blackwell | 106/14 |
| 4,115,344 | 9/1978 | Brady | 524/100 |
| 4,178,276 | 12/1979 | Shue et al. | 524/400 |
| 4,212,793 | 7/1980 | Shue | 428/419 |
| 4,214,021 | 7/1980 | Blackwell | 428/419 |
| 4,237,039 | 12/1980 | Blackwell | 525/537 |
| 4,406,840 | 9/1983 | Kroenke | 260/429 R |
| 4,680,334 | 7/1987 | Wallace | 524/406 |
| 4,748,169 | 5/1988 | Izutsu et al. | 524/500 |
| 5,006,588 | 4/1991 | Miller | 524/406 |
| 5,120,808 | 6/1992 | Satake et al. | 525/537 |
| 5,248,743 | 9/1993 | Satake et al. | 525/537 |

FOREIGN PATENT DOCUMENTS

| | | | |
|---|---|---|---|
| 147692 | 7/1985 | European Pat. Off. | |
| 0459619A2 | 4/1991 | European Pat. Off. | |
| 429180 | 5/1991 | European Pat. Off. | |
| 0459621A2 | 12/1991 | European Pat. Off. | |
| 53-37734 | 4/1978 | Japan | 524/406 |
| 57-205445 | 12/1982 | Japan | |
| 60-1866561 | 9/1985 | Japan | |
| 61-14228 | 1/1986 | Japan | |
| 62-109850 | 5/1987 | Japan | |
| 62-115030 | 5/1987 | Japan | |
| 62-241962 | 10/1987 | Japan | |
| 62-295955 | 12/1987 | Japan | |
| 63-45711 | 9/1988 | Japan | |
| 2-36264 | 2/1990 | Japan | |
| 2-105857 | 4/1990 | Japan | |
| 2-196858 | 8/1990 | Japan | |
| 2-218754 | 8/1990 | Japan | |
| 2-225527 | 9/1990 | Japan | |
| 3-143958 | 6/1991 | Japan | |
| 3-223332 | 10/1991 | Japan | |
| 4-100826 | 4/1992 | Japan | |
| 4-161457 | 6/1992 | Japan | |
| 4-164961 | 6/1992 | Japan | |
| 4-335065 | 11/1992 | Japan | |

OTHER PUBLICATIONS

Derwent Abstract No. 93-217021 of Japanese Reference No. 5-140452 dated Jun. 8, 1993.

*Primary Examiner*—John C. Bleutge
*Assistant Examiner*—Mark D. Sweet
*Attorney, Agent, or Firm*—Lowe, Price, Leblanc & Becker

[57] ABSTRACT

A poly(arylene sulfide) resin composition in which the tendency of a poly(arylene sulfide) resin to cause metals making up molds, processing machinery, metal parts of inserts and the like to corrode has been inhibited, and which has good processability includes the poly(arylene sulfide) resin and, as a corrosion inhibitor, at least one substance selected from the group consisting of a metallic simple substance of molybdenum, oxoacids of molybdenum, alkali metal salts of the oxoacids of molybdenum, alkaline earth metal salts of the oxoacids of molybdenum, the ammonium salts of the oxoacids of molybdenum, the zinc salts of the oxoacids of molybdenum, a metallic simple substance of tungsten, oxoacids of tungsten, alkali metal salts of the oxoacids of tungsten, alkaline earth metal salts of the oxoacids of tungsten, the ammonium salts of the oxoacids of tungsten and the zinc salts of the oxoacids of tungsten. The corrosion inhibitor being incorporated in a proportion within a range of 0.01–10 parts by weight per 100 parts by weight of the poly(arylene sulfide) resin.

16 Claims, No Drawings

POLY(ARYLENE SULFIDE) RESIN COMPOSITION

FIELD OF THE INVENTION

The present invention relates to a poly(arylene sulfide) resin composition in which the tendency of a poly(arylene sulfide) resin to cause metals making up molds, processing machinery, metal parts of inserts and the like to corrode (hereinafter may called "metal corrosiveness") has been inhibited, and more specifically to a poly(arylene sulfide) resin composition showing little tendency to cause metal corrosion and having good processability.

BACKGROUND OF THE INVENTION

Poly(arylene sulfide) resins (hereinafter abbreviated as "PAS resins") such as poly(phenylene sulfide), poly(phenylene ketone sulfide) and poly(phenylene sulfone sulfide), which have both arylene groups and sulfide groups in their molecules, are engineering plastics excellent in heat resistance, mechanical properties, chemical resistance, flame resistance, electrical properties, molding and processing ability, and the like, and used in wide fields such as electrical and electronic equipments and parts, automotive equipments and parts, and chemical equipments and parts.

The PAS resins however tend to form corrosive gases such as sulfur dioxide when heated to an elevated temperature, and hence involve problems that metallic portions of processing machines, molds and the like are corroded upon their molding and processing, or metal contacts, metal parts of inserts and the like in molded products are corroded. For example, the usual processing machine is made of an iron-based material and hence tends to suffer from chemical corrosion when coming into contact with a PAS resin melted upon its molding. On the other hand, the molded products thereof also become liable to color. The corrosion of a mold causes a great economical loss because the mold is expensive, and moreover makes it difficult to precisely mold. The corrosion of a metal contact in a relay making use of a PAS resin as a base causes a contact failure. The corrosion of a metal part of an insert works out the degradation of solderability at the metal part of the insert. When a PAS resin, which tends to produce a corrosive gas, is used as a sealant for an electronic part, the reliability of the electronic part is lowered.

In order to solve such corrosive problems involved in the PAS resins, it has been proposed to blend various kinds of corrosion inhibitors.

There have been proposed, as corrosion inhibitors for various PAS resins, for example, the hydroxides or carbonates of alkali metals (U.S. Pat. No. 4,017,450), hydrotalcite (Japanese Patent Application Laid-Open Nos. 186561/1985 and 218754/1990), the oxalates of metals selected from Groups IA, IIA and IIB of the periodic table (U.S. Patent No. 4,178,276), $\gamma$-alumina (Japanese Patent Application Laid-Open No. 241962/1987), zinc oxide (Japanese Patent Publication No. 45711/1988 and Japanese Patent Application Laid-Open No. 164961/1992), the hydroxides or oxides, or aromatic carboxylates of Group IIA metals of the periodic table, or aromatic carboxylates of Group IA metals of the periodic table (Japanese Patent Application Laid-Open No. 109850/1987), metal aluminates (Japanese Patent Application Laid-Open No. 295955/1987), zinc carbonate and/or zinc hydroxide (Japanese Patent Application Laid-Open No. 105857/1990), lithium sulfite (Japanese Patent Application Laid-Open No. 36264/1990), at least one element selected from zinc, lead, magnesium, manganese, barium and tin (Japanese Patent Application Laid-Open No. 205445/1982), the phosphates of Group IIB metals of the periodic table (Japanese Patent Application Laid-Open No. 161457/1992), the metaborates or tetraborates of Group IA or IIA metals of the periodic table, and the like (U.S. Pat. No. 4,212,793), ammonia precursors such as urea (U.S. Pat. No. 4,115,344), sodium nitrite (U.S. Pat. No. 4,214,021), alkali metal arylalkanates (U.S. Pat. No. 4,237,039), calcium carbonate (Japanese Patent Application Laid-Open Nos. 196858/1990 and 143958/1991), and alkali metal nitrites, benzoates or phthalates; ammonium chromates, benzoates or phthalates; mixtures of alkali metal chromates and alkali metal borates (U.S. Pat. No. 4,064,084).

However, the conventionally-known corrosion inhibitors involve, for example, the following drawbacks. The corrosion-inhibiting effect is insufficient (calcium carbonate, $\gamma$-alumina, zinc oxide, sodium oxalate, calcium phosphate, etc.); the mechanical strength of the PAS resin is deteriorated (zinc oxide, zinc carbonate, $\alpha$-alumina, etc.); and although they have a good corrosion-inhibiting effect, the melt-flow characteristics and crystallization properties of the PAS resin are lowered in that the melt viscosity of the PAS resin is increased to a significant extent and/or its crystallization speed is reduced to a great extent, and hence its processability is deteriorated (the hydroxides or oxides of Group IIA metals of the periodic table, sodium citrate, metal aluminates, sodium carbonate, lithium carbonate, sodium chromate, etc.), or toxicity is high (sodium chromate and ammonium chromate). There has not been provided under the circumstances any corrosion inhibitor which can fully satisfy in practical use.

OBJECTS AND SUMMARY OF THE INVENTION

It is an object of the present invention to provide a PAS resin composition in which the metal corrosiveness of a PAS resin upon and after its molding has been fully inhibited without deteriorating excellent heat resistance, mechanical properties, processability and the like inherent in the PAS resin.

The present inventors have carried out an extensive investigation with a view toward overcoming the above-described problems involved in the prior art. As a result, it has been found that metallic molybdenum and tungsten or their compounds impart an excellent corrosion-inhibiting effect to PAS resins and moreover exhibit excellent properties as a corrosion inhibitor without impairing the melt-flow characteristics, crystallization properties and mechanical properties of the PAS resins. The present invention has been led to completion on the basis of this finding.

According to the present invention, there is thus provided a poly(arylene sulfide) resin composition comprising a poly(arylene sulfide) resin and, as a corrosion inhibitor, at least one substance selected from the group consisting of a metallic simple substance of molybdenum, oxoacids of molybdenum, alkali metal salts of the oxoacids of molybdenum, alkaline earth metal salts of the oxoacids of molybdenum, the ammonium salts of the oxoacids of molybdenum, the zinc salts of the oxoacids of molybdenum, a metallic simple substance of tungsten, oxoacids of tungsten, alkali metal salts of the oxoacids of tungsten, alkaline earth metal salts of the oxoacids of tungsten, the ammonium salts of the oxoacids of tungsten and the zinc salts of the oxoacids of tungsten, said corrosion inhibitor being incorporated in a proportion within a range of 0.01–10 parts by weight per 100 parts by weight of the poly(arylene sulfide) resin.

DETAILED DESCRIPTION OF THE INVENTION

The features of the PAS resin compositions according to the present invention reside in first that the generation of corrosive gases upon melt molding of the PAS resin can be effectively suppressed, thereby reducing the corrosion of processing machines and molds, and of metal contacts and metal parts of inserts to a great extent, second that they exhibit excellent flow characteristics upon their melting, third that they exhibit excellent crystallization properties, and fourth that they provide molded products excellent in mechanical strength.

As described above, the conventional corrosion inhibitors have been such that the effect of inhibiting the generation of the corrosive gases is insufficient, that the mechanical strength is deteriorated, or that although the corrosion-inhibiting effect is excellent, the melt viscosity is increased to a great extent and/or the melt crystallization temperature is lowered to a significant extent, and hence the processability is deteriorated notably. On the contrary, the PAS resin compositions according to the present invention are well balanced between reduced corrosiveness, and processability, mechanical properties and the like.

PAS Resin

The PAS resin useful in the practice of the present invention is an aromatic polymer having predominant recurring units represented by the formula —(Ar—S)— in which Ar means an arylene group, and containing arylene groups and sulfide groups.

As exemplary arylene groups, may be mentioned a p-phenylene group, a m-phenylene group, substituted phenylene groups (the substituent being an alkyl group, preferably an alkyl group having 1–5 carbon atoms or a phenyl group), a p,p′-diphenylene sulfone group, a p,p′-biphenylene group, p,p′-diphenylenether group, a p,p′-diphenylenecarbonyl group, a naphthylene group, etc.

Among PAS resins containing the above-mentioned arylene groups, polymers predominantly having only the same arylene groups may preferably be used. However, copolymers having two or more different arylene groups, for example, random copolymers, block copolymers and alternating copolymers, may be used from the viewpoint of processability and heat resistance.

As a PAS resin used in the present invention, a poly(p-phenylene sulfide) resin (PPS resin) having predominant recurring units (including at least 50 wt. % of the recurring units) of p-phenylene sulfide represented by the chemical formula

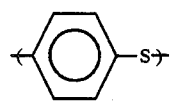

is particularly preferred because it is excellent in processability and industrially available with ease.

As examples of other PAS resins used in the present invention, may be mentioned poly(arylene ketone sulfide) resins (PKS resins) having predominant recurring units (including at least 50 wt. % of the recurring units) of arylene ketone sulfide represented by the general formula

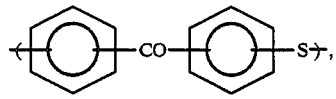

poly(arylene ketone ketone sulfide) resins (PKKS resins) having predominant recurring units (including at least 50 wt. % of the recurring units) of arylene ketone ketone sulfide represented by the general formula

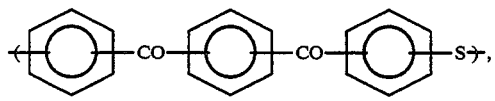

and poly(arylene sulfone sulfide) resins (PSS resins) having predominant recurring units (including at least 50 wt. % of the recurring units) of arylene sulfone sulfide represented by the general formula

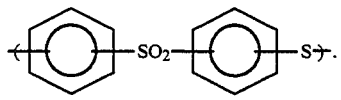

When the PAS resin used in the present invention is a copolymer, a copolymer containing p-phenylene sulfide recurring units and m-phenylene sulfide recurring units is preferred, with a block copolymer having respective blocks of these recurring units (as described, for example, in Japanese Patent Application Laid-Open No. 14228/1986) being particularly preferred.

As preferable examples of other copolymer-type PAS resins, may be mentioned copolymers having phenylene sulfide recurring units and arylene ketone sulfide recurring units, copolymers having phenylene sulfide recurring units and arylene ketone ketone sulfide recurring units, copolymers having phenylene sulfide recurring units and arylene sulfone sulfide recurring units, and copolymer having arylene ketone sulfide recurring units and arylene sulfone sulfide recurring units and copolymer having arylene ketone sulfide recurring units and arylene sulfone sulfide recurring units. These copolymers may be block copolymers (as described, for example, in Japanese Patent Application Laid-Open Nos. 225527/1990 and 223332/1991, EP-0459619-A2, EP-0459621-A2, and Japanese Patent Application Laid-Open Nos. 115030/1987 and 100826/1992).

Of these PAS resins, crystalline polymers may be particularly preferably used because they are excellent in processability, heat resistance and the like. These PAS resins may be used either singly or in any combination thereof.

Metallic Simple Substances and Compounds of Mo and W

Metallic simple substances used as a corrosion inhibitor in the present invention are molybdenum (Mo) and tungsten (W). In particular, these metallic simple substances may preferably be in the form of fine powder.

As examples of the oxoacids of molybdenum and tungsten, which are used in the present invention, may be mentioned orthomolybdic acid, isopolymolybdic acids such as paramolybdic acid (heptamolybdic acid) and metamolybdic acid (octamolybdic acid), which are condensation acids, heteropolymolybdic acids such as molybdophosphoric acid and molybdosilicic acid, orthotungstic acid, isopolytungstic acids such as paratungstic acid and metatungstic acid, and heteropolytungstic acids such as tungstophosphoric acid and tungstosilicic acid. Orthomolybdic acid, isopolymolybdic acids, orthotungstic acid and isopolytungstic acids are particularly preferred for use.

The alkali metal salts of the oxoacids of molybdenum and tungsten, which are used in the present invention, are salts of the above-described oxoacid of molybdenum or tungsten with a Group IA metal of the periodic table. The Group IA metal is selected from sodium, potassium and lithium. Of these salts, the sodium or potassium salt of orthomolybdic acid, the sodium or potassium salts of isopolymolybdic acids, the sodium or potassium salt of molybdophosphoric acid, the sodium or potassium salt of orthotungstic acid, the sodium or potassium salts of isopolytungstic acids, and the sodium or potassium salt of tungstophosphoric acid are preferably used.

The alkaline earth metal salts of the oxoacids of molybdenum and tungsten, which are used in the present invention, are salts of the above-described oxoacid of molybdenum or tungsten with a Group IIA metal of the periodic table. Group IIA metals include calcium, strontium and barium. Of these salts, the calcium or strontium salt of orthomolybdic acid, the calcium or strontium salts of isopolymolybdic acids, the calcium or strontium salt of orthotungstic acid, and the calcium or strontium salts of isopolytungstic acids are preferably used.

The ammonium salts of the oxoacids of molybdenum and tungsten, which are used in the present invention, are the ammonium salts of the above-described oxoacids of molybdenum or tungsten. Of these salts, ammonium paramolybdate, ammonium metamolybdate, ammonium paratungstate, ammonium metatungstate, ammonium molybdophosphate and ammonium tungstophosphate are preferably used.

The zinc salts of the oxoacids of molybdenum and tungsten, which are used in the present invention, are the zinc salts of the above-described oxoacids of molybdenum or tungsten. Of these salts, zinc orthomolybdate, zinc isopolymolybdates, zinc orthotungstate and zinc isopolytungstates are preferably used.

Some of these metallic compounds are industrially available in the form of a hydrate. The hydrates of these metallic compounds may be used as they are, or after they are dissolved in water or dehydrated. For example, sodium orthomolybdate is available in the form of dihydrate. Since this hydrate easily dissolves in water, a composition in which sodium orthomolybdate is finely dispersed in a PAS resin can be obtained by preparing an aqueous solution of the hydrate to disperse it in the PAS resin and then drying the resin. The hydrate may also be dry-blended directly with the PAS resin. The hydrate may be simply dehydrated into an anhydride by heating it to 100° C. or higher, and its average particle size may also be reduced with ease by its dehydration into the anhydride. Therefore, it may be dehydrated into fine powder in advance and then incorporated into the PAS resin.

It is preferable from the viewpoint of enhancing the corrosion-inhibiting effect that these metals or metallic compounds should be evenly dispersed in the form of fine particles so as to make the contact area with the PAS resin as great as possible. Particles having a fine particle size may be prepared with ease by a known grinding and classifying technique.

The metallic molybdenum and tungsten or their compounds may be used either singly or in any combination thereof.

Complexes of the metallic compound of molybdenum or tungsten according to the present invention and zinc oxide and/or calcium oxide also have an excellent corrosion-inhibiting effect, and give excellent flow characteristics and crystallization properties. Such combinations are hence preferred. As examples of such complexes, may be mentioned basic zinc molybdate, basic zinc calcium molybdate and basic zinc molybdate phosphate. These complexes may be available as industrial products under the trade names of "MOLY-WHITE" and "LF BOSEI".

From the viewpoint of corrosion-inhibiting effect and crystallization property-improving effect, other preferable combinations may also include combinations of the metallic compound of molybdenum or tungsten according to the present invention, in particular, the alkali metal salt of the oxoacid of molybdenum or tungsten and the oxide of molybdenum or tungsten.

The proportion of the metallic molybdenum and tungsten or their compounds to be added is within a range of, generally 0.01-10 parts by weight, preferably 0.01-5 parts by weight per 100 parts by weight of the PAS resin. If this proportion is smaller than 0.01 parts by weight, such a proportion is too small to sufficiently exhibit the corrosion-inhibiting effect. On the contrary, if this proportion exceeds 10 parts by weight, such a large proportion might affect mechanical properties, flowability, etc.

PAS Resin Composition

With respect to the PAS resin compositions according to the present invention, the metal corrosiveness is greatly inhibited compared with the case of a PAS resin alone. In addition, since the PAS resin compositions of the present invention do not very undergo increase in melt viscosity and lowering of crystallization temperature, it has good processability and excellent mechanical properties.

(1) Corrosiveness

The first feature of the PAS resin compositions according to the present invention resides in that the metal corrosiveness inherent in the PAS resin is remarkably inhibited. The metal corrosiveness of the PAS resin or PAS resin compositions can be evaluated in accordance with the following testing method:

Testing Method of Corrosiveness

A glass-made test tube having an external diameter of 21 mm and a length of 200 mm was charged with 4 g of a PAS resin or a PAS resin composition containing 4 g of the PAS resin in the form of powder (which passes through a screen having an opening size of 350 $\mu$m, i.e., a 42-mesh screen). A stainless steel foil, SUS 304 H (thickness: 50 $\mu$m, width: 18 mm, length: 160 mm) as a specimen for corrosion test is then placed in the test tube which is then closed with an open cell sponge stopper made of silicone rubber. Using a block bath (SSC-9100, manufactured by Senshu Kagaku K.K.), the test tube is heated for 3 hours at 280° C. After the heating treatment, the specimen is left over for about 12 hours at room temperature. Thereafter, the corroded condition of the specimen is visually observed. The PAS resin compositions are evaluated by whether the metal corrosiveness of the PAS resin compositions has been inhibited or reduced compared with the case of the PAS resin alone to rank them as the metal corrosion-inhibiting effect owing to the incorporation of additives in accordance with the following standard:

A: A remarkable effect was recognized;
B: An effect was recognized;
C: A slight effect was recognized; and
D: No effect was recognized.

(2) Flow Characteristics

The second feature of the PAS resin compositions according to the present invention resides in that the flow characteristics are stable (constant). In thin-wall molding or precision molding, a resin is particularly required to have high flowability upon its melt processing. Even in common molding and processing, it is not preferable that flow characteristics are increased greatly due to the addition of a corrosion inhibitor in a small amount because the determination of optimum conditions for molding becomes difficult. The constancy of the flow characteristics can be evaluated in the following manner.

Evaluation Method of Constancy of Flow Characteristics

Using a "Capirograph" (manufactured by Toyo Seiki Seisaku-Sho, Ltd.), the melt viscosity, $\eta^*_0$ (shear rate: 1200/sec) of a PAS resin and the melt viscosity, $\eta^*$ (shear rate: 1200/sec) of a PAS resin composition containing the PAS resin and a corrosion inhibitor are measured to express the constancy in terms of a ratio, $\eta^*/\eta_0$ of $\eta^*$ to $\eta^*_0$. Values obtained by using a capillary having an internal diameter of 1 mm and an L/D of 10/1 to measure them after preheating for 5 minutes are regarded as measurements. The measuring temperature is preset to 310° C. for a PAS resin having no crystalline melting point or a crystalline melting point lower than 300° C., to 370° C. for a PAS resin whose crystalline melting point is not lower than 300° C., but lower than 365° C., or to a temperature higher than a crystalline melting point by 10° C. for a PAS resin whose crystalline melting point is not lower than 365° C.

The $\eta^*/\eta^*_0$ of the PAS resin composition according to the present invention is generally 1.6 or lower, preferably 1.5 or lower, more preferably 1.4 or lower. If $\eta^*/\eta^*_0$ exceeds 1.6, the flowability of the resin composition becomes deteriorated due to the addition of the corrosion inhibitor. Such a high value is hence not preferred. The improvement of flowability owing to the addition of the corrosion inhibitor is preferred from the viewpoint of molding and processing. However, it is not preferable that scission of the principal chain of the PAS resin occurs due to the addition of the corrosion inhibitor, and flowability is hence deteriorated to a significant extent. Therefore, $\eta^*/\eta^*O$ is generally within a range of 0.3–1.6, preferably 0.5–1.5.

(3) Crystallization Properties

The third feature of the PAS resin compositions according to the present invention resides in that when a crystalline PAS resin is used, the PAS resin compositions can retain excellent crystallization properties inherent in the PAS resin.

Among the crystallization properties, the easiness of crystallization is a chief factor in the determination of solidification speed in injection molding or the like and greatly affects productivity. The easiness of crystallization also greatly affects crystallinity which controls mechanical properties such as heat resistance and modulus of elasticity. Therefore, it is not preferable that the crystallization properties of the crystalline PAS resin is impaired due to the addition of a corrosion inhibitor in a small amount. The crystallization properties of the PAS resin can be evaluated by its melt crystallization temperature. More specifically, the inhibitory degree of crystallization can be evaluated by the following method.

Evaluation Method

The melt crystallization temperature of each sample is measured by means of a differential scanning calorimeter at a cooling rate of 10° C./min after about 10 mg of the sample are heated to 340° C. for a PAS resin whose crystalline melting point is lower than 300° C., to 400° C. for a PAS resin whose crystalline melting point is not lower than 300° C., but lower than 365° C., or to a temperature higher than a crystalline melting point by 20° C. for a PAS resin whose crystalline melting point is not lower than 365° C. in an inert gas atmosphere, and held for 1 minute at its corresponding heating temperature. An inhibitory degree of crystallization, $\Delta(Tmc)$ can be expressed by the following equation:

$$\Delta(Tmc) = [(Tmc)_0 - (Tmc)]/(Tmc)_0 \times 100$$

wherein $(Tmc)_O$ is a melt crystallization temperature of a PAS resin alone and $(Tmc)$ is a melt crystallization temperature of a composition obtained by adding a corrosion inhibitor to the PAS resin.

The inhibitory degree of crystallization becomes smaller as the $\Delta(Tmc)$ value decreases. It is preferable that the inhibitory degree of crystallization should be as small as possible. In particular, its value becoming minus means that the crystallization is quickened and the corrosion inhibitor also has an effect as a crystallization-promoting agent, and is hence preferred. In the PAS resin compositions according to the present invention, the value is generally 15 or smaller, preferably 14 or smaller, more preferably 13 or smaller. Values exceeding 15 are not preferred because crystallization becomes difficult.

It is preferable that at least one substance selected from the group consisting of metallic molybdenum and tungsten and their compounds, namely, the corrosion inhibitor useful in the practice of the present invention, should be mixed with a PAS resin as evenly as possible. As a mixing method, may be used a variety of known methods. For example, the predetermined corrosion inhibitor may be added to the PAS resin to dry-blend them by a mixer or tumbler. Alternatively, the corrosion inhibitor in the form of an aqueous solution, organic solvent solution or slurry may be added to the PAS resin to blend them, followed by drying of the resulting blend. A mixture may be charged into a singleor twin-screw extrusion kneader or the like to melt and knead it at 260°-450° C. A PAS resin composition containing the corrosion inhibitor in a high concentration may be prepared in advance to use the composition as a masterbatch which is then diluted with the PAS resin to give a predetermined proportion.

A various kinds of fillers may be added to the PAS resin compositions according to the present invention as needed. The fillers are generally incorporated for a purpose of improving mechanical strength, heat resistance, dimensional stability, electrical properties, etc. The fillers are selected from inorganic and organic compounds and used in the form of fibers, plates, powder or hollows as necessary for the end application intended.

As exemplary fibrous fillers, may be mentioned glass fibers, carbon fibers, Aramid fibers, boron fibers, potassium titanate fibers, silica fibers, silica-alumina fibers, asbestos fibers, zirconia fibers, boron nitride fibers, silicon nitride fibers, silicon carbide fibers, stainless steel fibers, alumina fibers and the like.

As exemplary platy or powdery fillers, may be mentioned metal oxides such as silica, diatomaceous earth, alumina, titanium oxide, iron oxides, zinc oxide and magnesium oxide; metal hydroxides such as aluminum hydroxide, magnesium hydroxide and basic magnesium carbonate; metal carbonates such as calcium carbonate, magnesium carbonate and dolomite; metal sulfates or sulfites such as calcium sulfate, barium sulfate and calcium sulfite; silicates such as talc, clay, mica, asbestos, glass beads, calcium silicate, montmorillonite, bentonite and kaolin; metals such as iron, lead and aluminum; and other fillers such as lead titanate and lead zirconate.

As exemplary hollow fillers, may be mentioned glass balloons, pumice balloons and hollow silica and the like.

These fillers may be use either singly or in any combination thereof. Although the proportion of the fillers to be blended may vary with the end application intended, it is generally not higher than 400 parts by weight, preferably not higher than 250 parts by weight per 100 parts by weight of the resin component in the PAS resin composition. If the proportion is too high, the molding and processing ability and toughness of the resulting resin composition are impaired. It is hence not preferable to blend the fillers in such a high proportion.

The PAS resin compositions according to the present invention may contain at least one filler having a functionality-imparting effect. Typical examples thereof include magnetic powders, for example, ferrite magnetic powders represented by $MO \cdot 6Fe_2O_3$ (M: at least one of Ba, Sr, Ca, Mg, Zn and Pb), rare earth cobalt magnetic powders of $RCO_5$ or $R_2CO_{17}$ (R: at least one of rare earth elements such as Sm, Pr, Oe and La), alnico magnetic powder, manganese.bismuth magnetic powder, manganese.zinc ferrite magnetic powder and manganese.magnesium.ferrite magnetic powder.

The proportion of these magnetic powders to be blended is generally not higher than 1600 parts by weight, preferably 200-1200 parts by weight per 100 parts by weight of the resin component in the PAS resin composition. Proportions of the magnetic powder exceeding 1600 parts by weight result in a resin composition deteriorated in moldability and lowered in magnetic properties. Proportions too low result in a resin composition having insufficient magnetic properties.

The PAS resin compositions according to the present invention may be mixed with at least one of other thermoplastic resins and thermosetting resins compatible with the PAS resin within limits not impeding the object of the present invention. As specific examples thereof, may be mentioned aromatic polyether ketones such as poly(ether ether ketones) (PEEKs) and poly(ether ketones) (PEKs), polyesters (including aromatic polyesters, liquid crystalline polyesters and polyarylates), polyamides (including Aramids), aromatic polysulfones such as polysulfones and polyether sulfones, polyether imides, polyamide imides, polyphenylene ethers, modified polyphenylene ethers, ABS resins, polycarbonate, polyacetal, polybutylene terephthalate, polyethylene terephthalate, fluororesins, epoxy resins, silicone resins, polyimide, etc.

The PAS resin compositions may be mixed with at least one elastomer for the purpose of improving the impact resistance of the PAS resin. As examples thereof, may be mentioned polyolefinic copolymers including olefinic copolymers containing epoxy groups, or acid or acid anhydride groups in their side chains or principal chains, diene elastomers, polystyrene elastomers, polyamide elastomers, polyester elastomers, polyurethane elastomers, fluorine-containing elastomers, silicone elastomers, polysulfide elastomers, acrylic copolymers and their salts with metals such as Na, Zn, K, Ca and Mg, organosiloxane rubber, and the like.

The resin components such as the thermoplastic resins, thermosetting resins and elastomers may be incorporated either singly or in any combination thereof in a proportion of generally 0-400 parts by weight, preferably 0-200 parts by weight, more preferably 0-100 parts by weight per 100 parts by weight of the PAS resin. If the proportion of the resin component exceeds 400 parts by weight, there is a potential problem that the excellent heat resistance, chemical resistance, molding and processing ability and the like inherent in the PAS resin could be impaired substantially in the resulting resin composition.

The PAS resin compositions according to the present invention may also be added suitably with various additives such as antioxidants, stabilizers, lubricants, mold-releasing agents, pigments and/or silane coupling agents as needed. The conventionally-known corrosion inhibitors may also be added within limits not impeding the object of the present invention. In particular, specific zinc compounds (Japanese Patent Application Laid-Open No. 164961/1992) which are said to have an effect of inhibiting silver corrosion, and zinc carbonate and zinc hydroxide (Japanese Patent Application Laid-Open No. 105857/1990), and the like may preferably be used.

The PAS resin compositions of the present invention can be used as molding or forming materials and coating materials. The PAS resin compositions of the present invention are molded or formed by injection molding, extrusion, vacuum forming, compression molding or the like. The occurrence of metal corrosion in the forming or molding equipments upon their pelletizing, or molding or forming by the above molding or forming methods is inhibited. In addition, since corrosion products such as rust are prevented from containing in molded or formed products, the molded or formed products can be provided as products substantially free from coloring.

The PAS resin compositions according to the present invention are useful as molding or forming compositions, in particular, for molded or formed products used in combination with metal, or for outsert molding or insert molding.

ADVANTAGES OF THE INVENTION

The PAS resin compositions according to the present invention have the following advantageous effects:

(1) since they are resin compositions in which the corrosiveness of the PAS resin has been reduced to a great extent, the corrosion of metal parts such as a cylinder and a mold is lessened, thereby permitting their economical and efficient processing;

(2) since the corrosiveness of the PAS resin is reduced and improved to a great extent without impairing the excellent flow characteristics and crystallization properties inherent in the PAS resin, their application fields can be widened;

(3) the corrosiveness of the PAS resin is reduced and improved to a great extent without impairing the excellent mechanical properties inherent in the PAS resin; and (4) since they scarcely corrode metal, they are suitable for use in molded or formed products used in combination with metal, or as resin compositions for outsert molding or insert molding.

EMBODIMENTS OF THE INVENTION

The present invention will hereinafter be described more specifically by the following examples and comparative examples. It should however be borne in mind that the present invention is not limited to the following examples only.

Example 1 and Comparative Example 1

Various metals and metallic compounds shown in Tables 1 and 2 were separately added to 100 parts by weight of poly(p-phenylene sulfide) resin (PPS resin, "FORTRON KPS W205" product of Kureha Chemical Industry Co., Ltd., crystalline melting point: 285° C.) as a PAS resin in their corresponding proportions shown in Tables 1 and 2 to blend the respective mixtures by hand. Each of the resultant blends was kneaded in a single-screw extruder at a cylinder temperature of 310° C. to obtain an extrudate of a resin composition. This extrudate was ground and sifted by a screen to prepare a sample having a fixed particle size which passed through a 42-mesh screen, but was captured on a 100-mesh screen.

The results of the corrosion test are shown in Tables 1 and 2.

As apparent from the results shown in Tables 1 and 2, the PAS resin compositions according to the present invention are inhibited in metal corrosiveness, and are also small in rate of change in melt viscosity and hence excellent in flow characteristics. Even with respect to the crystallization speed, they are found to substantially retain the crystallization speed of the PAS resin. On the contrary, it is understood that the known corrosion inhibitors such as calcium hydroxide, sodium carbonate, sodium aluminate and sodium chromate each have a good corrosion-inhibiting effect, but change the melt viscosity and crystallization speed of the PAS resin to a great extent.

With respect to calcium carbonate, sodium oxalate, zinc oxide, zinc phosphate, calcium phosphate and molybdenum sulfide, no corrosion-inhibiting effect is recognized.

TABLE 1

| Ex. | Additive Kind | Amount added (part) | Corrosion-inhibiting effect | $\eta^*/\eta^*0$ | $\Delta Tmc$ |
|---|---|---|---|---|---|
| 1-1 | Sodium orthomolybdate | 0.1 | C | 1.0 | 0.0 |
| 1-2 | Sodium orthomolybdate | 0.3 | B | 1.0 | 7.5 |
| 1-3 | Sodium orthomolybdate | 1.0 | A | 1.0 | 6.3 |
| 1-4 | Sodium orthomolybdate | 2.0 | A | 0.9 | 5.9 |
| 1-5 | Sodium isopolymolybdate | 1.0 | B | 1.0 | 0.6 |
| 1-6 | Potassium orthomolybdate | 1.0 | A | 0.9 | 11.4 |
| 1-7 | Lithium orthomolybdate | 1.0 | C | 0.9 | 9.4 |
| 1-8 | Ammonium paramolybdate | 1.0 | A | 0.9 | 8.6 |
| 1-9 | Calcium orthomolybdate | 1.0 | C | 1.1 | 0.0 |
| 1-10 | Zinc orthomolybdate | 1.0 | B | 1.1 | 2.8 |
| 1-11 | Strontium orthomolybdate | 1.0 | B | 1.1 | 1.1 |
| 1-12 | Orthomolybdic acid | 1.0 | A | 0.9 | 7.8 |
| 1-13 | Molybdenum | 1.0 | B | 0.9 | 0.4 |
| 1-14 | Sodium orthotungstate | 1.0 | B | 0.8 | 2.7 |
| 1-15 | Potassium orthotungstate | 1.0 | A | — | 14.1 |
| 1-16 | Tungsten | 1.0 | C | 0.9 | 0.0 |
| 1-17 | Molybdophosphoric acid | 1.0 | C | — | 14.1 |
| 1-18 | Sodium molybdophosphate | 1.0 | A-B | — | 11.4 |
| 1-19 | Ammonium-molybdophosphate | 1.0 | B | — | 12.5 |
| 1-20 | Sodium tungstophosphate | 1.0 | C | — | 3.9 |

TABLE 2

| Comp. Ex. | Additive Kind | Amount added (part) | Corrosion-inhibiting effect | $\eta^*/\eta^*0$ | $\Delta Tmc$ |
|---|---|---|---|---|---|
| 1-1 | Not added | — | — | — | — |
| 1-2 | Calcium hydroxide | 1.0 | A | 2.2 | 17.6 |
| 1-3 | Sodium carbonate | 1.0 | A | 1.8 | 16.0 |
| 1-4 | Sodium aluminate | 1.0 | A | 1.7 | 15.5 |
| 1-5 | Sodium chromate | 1.0 | A | 1.8 | 15.5 |
| 1-6 | Calcium carbonate | 1.0 | D | — | 11.8 |
| 1-7 | Sodium oxalate | 1.0 | D | — | 4.3 |
| 1-8 | Zinc oxide | 1.0 | D | — | 7.8 |
| 1-9 | Calcium phosphate | 1.0 | D | — | 2.0 |
| 1-10 | Molybdenum sulfide | 1.0 | D | — | 1.0 |

(Note)
The details of the metals and metallic compounds shown in Tables 1 and 2 are as follows. The amounts added are values converted according to purity.

(1) Sodium orthomolybdate: $Na_2MoO_4 \cdot 2H_2O$ (product of Wako Pure Chemical Industries, Ltd.)

(2) Sodium isopolymolybdate: $Na_2Mo_3O_4$ (product of Nippon Inorganic Colour & Chemical Co., Ltd.)

(3) Potassium orthomolybdate: $K_2MoO_4$ (product of Wako Pure Chemical Industries, Ltd.)
(4) Lithium orthomolybdate: $Li_2MoO_4$ (product of Wako Pure Chemical Industries, Ltd.)
(5) Ammonium orthomolybdate: $(NH_4)_6Mo_7O_{24} \cdot 4H_2O$ (product of Wako Pure Chemical Industries, Ltd.)
(6) Calcium orthomolybdate: $CaMoO_4$ (product of Wako Pure Chemical Industries, Ltd.)
(7) Zinc orthomolybdate: $ZnMoO_4$ (product of Nippon Inorganic Colour & Chemical Co., Ltd.)
(8) Strontium orthomolybdate: $SrMoO_4$ (product of Nippon Inorganic Colour & Chemical Co., Ltd.)
(9) Orthomolybdic acid: $H_2MoO_4$ (product of Wako Pure Chemical Industries, Ltd.)
(10) Molybdenum: Mo powder (product of Wako Pure Chemical Industries, Ltd.)
(11) Sodium orthotungstate: $Na_2WO_4 \cdot 2H_2O$ (product of Kanto Chemical Co., Ltd.)
(12) Potassium orthotungstate: $K_2WO_4$ (product of Nippon Inorganic Colour & Chemical Co., Ltd.)
(13) Tungsten: W powder (product of Wako Pure Chemical Industries, Ltd.)
(14) Molybdophosphoric acid: $H_3PMo_{12}O_{40}$ (product of Wako Pure Chemical Industries, Ltd.)
(15) Sodium molybdophosphate: $Na_3PMo_{12}O_{40}$ (product of Wako Pure Chemical Industries, Ltd.)
(16) Ammonium molybdophosphate: $(NH_4)_3PMo_{12}O_{40}$ (product of Nippon Inorganic Colour & Chemical Co., Ltd.)
(17) Sodium tungstophosphate: $Na_3PMo_{12}O_{40}$ (product of Nippon Inorganic Colour & Chemical Co., Ltd.)
(18) Calcium hydroxide: $Ca(OH)_2$ (product of Kanto Chemical Co., Ltd.)
(19) Sodium carbonate: $Na_2CO_3$ (product of Kanto Chemical Co., Ltd.)
(20) Sodium aluminate: $NaAlO_2$ (product of Wako Pure Chemical Industries, Ltd.)
(21) Sodium chromate: $Na_2CrO_4 \cdot 4H_2O$ (product of Kanto Chemical Co., Ltd.)
(22) Calcium carbonate: $CaCO_3$ (product of Wako Pure Chemical Industries, Ltd.)
(23) Sodium oxalate: $C_2O_4Na_2$ (product of Wako Pure Chemical Industries, Ltd.)
(24) Zinc oxide: ZnO (product of Kanto Chemical Co., Ltd.)
(25) Calcium phosphate: $Ca_3(PO_4)_2$ (product of Kanto Chemical Co., Ltd.)
(26) Molybdenum sulfide: $MoS_2$ (product of Wako Pure Chemical Industries, Ltd.)

Example 2 and Comparative Example 2

Glass fibers ("ECS03T", product of Nippon Electric Glass Co., Ltd., diameter: 13 μm, length: 3 mm) and a corrosion inhibitor were blended with a PPS resin ("FORTRON KPS W205", product of Kureha Chemical Industry Co., Ltd., crystalline melting point: 285° C.) in their corresponding proportions shown in Table 3. They were melted and kneaded at 320° C. in a twin-screw extruder ("BT-30", manufactured by Plastic Kogaku Kenkyusho), thereby obtaining pellets. The pellets thus obtained were molded by means of an injection molding machine ("IS-75", manufactured by TOSHIBA CORP) at a mold temperature of 145° C., thereby producing specimens for evaluating mechanical properties.

The mechanical properties were evaluated by determining tensile strength and flexural strength in accordance with ASTM D 638 and ASTM D 790, respectively. The corrosion-inhibiting effect, melt viscosity and melt crystallization temperature were determined using the pellets. The results are shown in Table 3.

TABLE 3

| | Additive | | PAS resin (part) | Glass fibers (part) | Corrosion-inhibiting effect | $\eta^*$ (poise) | Tmc (°C.) | Tensile strength (kg/mm$^2$) | Flexural strength (kg/mm$^2$) |
|---|---|---|---|---|---|---|---|---|---|
| | Kind | Amount added (part) | | | | | | | |
| Ex. 2-1 | Sodium orthomolybdate | 0.15 | 59.85 | 40 | B | 3170 | 239 | 17.9 | 25.5 |
| Ex. 2-2 | Sodium orthomolybdate | 0.30 | 59.70 | 40 | A | 3270 | 238 | 18.0 | 25.1 |
| Ex. 2-3 | Sodium orthomolybdate | 0.60 | 59.40 | 40 | A | 3090 | 235 | 17.1 | 25.1 |
| Comp. Ex. 2-1 | Not added | — | 60.00 | 40 | — | 2960 | 242 | 17.5 | 24.4 |
| Comp. Ex. 2-2 | Basic zinc carbonate | 0.15 | 59.85 | 40 | A | 3870 | 233 | 14.4 | 25.0 |
| Comp. Ex. 2-3 | Basic zinc carbonate | 0.30 | 59.70 | 40 | A | 3750 | 234 | 15.2 | 22.5 |
| Comp. Ex. 2-4 | Basic zinc carbonate | 0.60 | 59.40 | 40 | A | 3760 | 237 | 15.6 | 22.8 |
| Comp. Ex. 2-5 | Lithium carbonate | 0.60 | 59.40 | 40 | A | 3340 | 215 | 16.0 | 24.0 |

(Note)
The details of the metallic compounds shown in Table 3 are as follows. The amounts added are values converted according to purity.
(1) Sodium orthomolybdate: $Na_2MoO_4 \cdot 2H_2O$ (product of Wako Pure Chemical Industries, Ltd.)
(2) Basic zinc carbonate: (product of Sakai Chemical Industry Co., Ltd.)
(3) Lithium carbonate: $Li_2CO_3$ (Junsei Chemical Co., Ltd.)

As apparent from the results shown in Table 3, the PAS resin compositions according to the present invention are excellent in corrosion-inhibiting effect and scarcely undergo changes in melt-flow characteristics in spite of the addition of the corrosion inhibitor. With respect to the easiness of crystallization, they also retain substantially the same high level as that of the PAS resin. Further, it is understood that the PAS resin composition according to the present invention also retain high levels of tensile strength and flexural strength, or rather, are improved in such strength.

On the other hand, with respect to the resin compositions separately containing basic zinc carbonate and lithium carbonate which are conventional corrosion inhibitors, it is recognized that the melt-flow characteristics are deteriorated, the crystallization becomes hard, or the strength is lowered

Example 3

In this example, the characteristics or properties of PAS resin compositions in which a corrosion inhibitor has been finely dispersed in a PAS resin by dispersing an aqueous solution of the corrosion inhibitor in the PAS resin and then drying the resultant dispersion will be described.

After 100 parts by weight of the same PPS resin as that used in Example 1 were blended with an aqueous solution of sodium orthomolybdate, water was removed from the resultant blend by evaporation (the proportion of sodium orthomolybdate being 0.5 PHR of the polymer). A portion of the thus-obtained Composition (1) was melt-pressed at 310° C. and then cooled with water, thereby obtaining a sheet having a thickness of about 0.5 mm. This sheet is regarded as Sample A.

Another portion of Composition (1) was melted and kneaded at 310° C. in a single-screw kneader and then processed in the same manner as described above, thereby obtaining a pressed sheet. This sheet is regarded as Sample B.

Sodium orthomolybdate was dry-blended with the PPS resin in a proportion of 0.5 PHR of the resin, and the resultant blend was processed in the same manner as in Sample B, thereby obtaining a pressed sheet. This sheet is regarded as Sample C.

With respect to Samples A, B and C, portions thereof were immersed for 20 hours in hot water of 95° C. to observe their surface appearances. Besides, the corrosion-inhibiting effect and crystallization properties were determined in the same manner as in Example 1. The results are shown in Table 4.

TABLE 4

| Sample | Corrosion-inhibiting effect | ΔTmc | Surface appearance |
|---|---|---|---|
| A | A | 7.3 | Less surface roughness than Sample C |
| B | A | 8.6 | Smooth and glossy without any surface roughness |
| C | A | 9.7 | Rough and lusterless surface as a whole |

As apparent from Table 4, when the corrosion inhibitor is finely dispersed in the form of the aqueous solution in the PAS resin, the crystallization properties can be improved while retaining the excellent corrosion-inhibiting effect. It is also understood that the surface characteristics can be improved.

Example 4

In this example, the fact that when the corrosion inhibitor useful in the practice of the present invention is blended in a PAS resin low in melt crystallization temperature [(Tmc)₀], its corrosiveness can be inhibited, and its crystallization properties can also be improved will be described.

Synthesis Experiment 1 (PPS resin)

A titanium-lined autoclave was charged with 7.0 kg of N-methylpyrrolidone (NMP) and 3.03 kg (18.02 moles) of hydrated sodium sulfide (water content: 53.6 wt. %). After the autoclave being purged with nitrogen gas, 2.02 kg of an NMP solution, which contained 1.32 kg of water, and 0.41 mole of hydrogen sulfide were distilled out while gradually heating the contents to 200° C. Thereafter, a liquid mixture consisting of 2.65 kg (18.03 moles) of p-dichlorobenzene, 0.24 kg (13.32 moles) of water and 3.70 kg of NMP was fed to react the contents at 220° C. for 5 hours. Then, 0.72 kg (40.00 moles) of water were additionally introduced under pressure in the autoclave. The contents were heated to 255° C. to react them for 3 hours. The resultant reaction mixture was sifted by a screen to separate the resulting particulate polymer. The polymer was washed three times with acetone and further three times with water, and then dewatered and dried at 100° C., thereby obtaining a PPS resin (P1) as white granules.

Evaluation of Corrosion-Inhibiting Effect and the Like

With 100 parts by weight of the above-obtained PPS resin (P1), was dry-blended 1 part by weight of sodium orthomolybdate or orthomolybdic acid to evaluate the resultant composition in the same manner as in Example 1. However, the corrosion test was conducted at 330° C. in place of 280° C. The results are shown in Table 5.

TABLE 5

| Ex. | Additive Kind | Amount added (part) | Corrosion-inhibiting effect | η*/η* 0 | ΔTmc |
|---|---|---|---|---|---|
| 4-1 | Sodium orthomolybdate | 1.0 | A | 1.0 | −4.9 |
| 4-2 | Orthomolybdic acid | 1.0 | A | 0.6 | −9.7 |

Example 5

In this example, the effect of the combination of the corrosion inhibitors useful in the practice of the present invention will be described. The preparation of samples and the evaluation of the corrosion-inhibiting effect and the like are conducted in the same manner as in Example 1. The results are shown in Table 6.

TABLE 6

| | Additive Kind | Amount added (part) | Corrosion-inhibiting effect | η*/η* 0 | ΔTmc |
|---|---|---|---|---|---|
| Ex. 5-1 | Sodium orthomolybdate | 0.5 | A | 1.0 | 0.2 |
| | Molybdenum oxide | 0.5 | | | |
| Ex. 5-2 | Sodium orthomolybdate | 0.5 | A | 1.1 | −0.1 |
| | Molybdenum oxide | 0.7 | | | |
| Ref. Ex. 5-1 | Sodium orthomolybdate | 0.5 | A | 0.9 | 8.9 |
| Ref. Ex. 5-2 | Sodium orthomolybdate | 1.0 | A | 0.9 | 6.3 |
| Ref. Ex. 5-3 | Molybdenum oxide | 0.5 | D | — | 3.5 |

As apparent from Table 6, the combined use of sodium orthomolybdate and molybdenum oxide makes it possible to achieve a crystallinity-improving effect which can not be given by their single use.

Example 6

In this example, the effect of the combination of the corrosion inhibitor useful in the practice of the present invention and another known corrosion inhibitor will be described.

The preparation of samples and the evaluation of the corrosion-inhibiting effect and the like are conducted in the same manner as in Example 1. The results are shown in Table 7.

TABLE 7

| | Additive | | Corrosion-inhibiting effect | $\eta^*/\eta^*0$ | $\Delta Tmc$ |
|---|---|---|---|---|---|
| | Kind | Amount added (part) | | | |
| Ex. 6-1 | MOLY-WHITE 101 | 1.0 | A | 1.3 | 4.9 |
| EX. 6-2 | MOLY-WHITE 212 | 1.0 | A | 1.1 | 1.8 |
| Ex 6-3 | MOLY-WHITE ZNP | 1.0 | A | 1.2 | 5.4 |
| Ex. 6-4 | LF BOSEI M-PSN | 1.0 | A | 1.2 | 4.6 |
| Ex. 6-5 | LF BOSEI MC-400WR | 1.0 | A | 1.2 | 3.2 |
| Ex. 6-6 | MOLY-WHITE P-3S | 1.0 | C | — | — |
| Ex. 6-7 | MOLY-WHITE C-50 | 1.0 | C | 1.1 | 1.4 |
| Ref. Ex. 6-1 | Zinc orthomolybdate | 1.0 | C | 1.2 | 2.5 |
| Ref. Ex. 6-2 | Calcium orthomolybdate | 1.0 | C | 1.1 | 0.4 |
| Comp Ex. 6-1 | Not added | — | — | — | — |
| Comp Ex. 6-2 | Zinc oxide | 1.0 | D | — | 7.8 |

(Note)

The details of the metallic compounds shown in Table 7 are as follows:

(1) MOLY-WHITE 101: Basic zinc molybdate, $ZnO \cdot ZnMoO_4$ (product of The Honjo Chemical Corporation) $MoO_3$ content: 14.6 wt. %, ZnO content: 84.6 wt. %

(2) MOLY-WHITE 212: Basic zinc calcium molybdate, $ZnO \cdot CaMoO_4$ (product of The Honjo Chemical Corporation) $MoO_3$ content: 8.9 wt. %, ZnO content: 10.5 wt. %, Ca content: 30.6 wt. %

(3) MOLY-WHITE ZNP: Basic zinc molybdate phosphate, $ZnO \cdot ZnMoO_4 \cdot Zn_3(PO_4)_2$ $MoO_3$ content: 3.5 wt. %, ZnO content: 75 wt. %

(4) LF BOSEI M-PSN: Basic zinc molybdate (product of Kikuchi Color & Chemicals Corp) $MoO_3$ content: 17 wt. %, ZnO content: 76 wt. %

(5) LF BOSEI MC-400WR: Basic zinc calcium molybdate (product of Kikuchi Color & Chemicals Corp) $MoO_3$ content: 9 wt. %, ZnO content: 13 wt. %, CaO content: 43 wt. %

(6) MOLY-WHITE P-3S: Basic zinc molybdate (product of Nippon Inorganic Colour & Chemical Co., Ltd.) $MoO_3$ content: 17.1 wt. %, ZnO content: 78 wt. %

(7) MOLY-WHITE C-50: Basic calcium molybdate, $CaO \cdot CaMoO_4$ (product of Nippon Inorganic Colour & Chemical Co., Ltd.) $MoO_3$ content: 12 wt. %, $CaCO_3$ content: 82.3 wt. %

(8) Zinc orthomolybdate: $ZnMoO_4$ (product of Nippon Inorganic Colour & Chemical Co., Ltd.)

(9) Calcium orthomolybdate: $CaMoO_4$ (product of Nippon Inorganic Colour & Chemical Co., Ltd.)

(10) Zinc oxide: ZnO (product of Kanto Chemical Co., Inc.)

Example 7

In this example, the corrosion-inhibiting effect on PAS resins having ketone and sulfone groups in addition to the sulfide groups will be described.

Synthesis Experiment 2

A PPS/PKS block copolymer (P2), a PPS/PKKS block copolymer (P3) and a PKS resin (P4) were prepared respectively on the basis of Synthesis Experiments 2, 4 and 5 described in Japanese Patent Application Laid-Open No. 335065/1992.

Further, a PSS resin was prepared in the following manner:

A 20-liter autoclave was charged with 10 kg of NMP, 1.69 kg of hydrated sodium sulfide (purity: 46.2 wt. %), 0.33 kg of lithium acetate, 2.934 kg of 4,4'-dichlorodiphenyl sulfone and 0.89 kg of water. After the autoclave being purged with nitrogen gas, the contents were reacted for 3 hours at 190° C. The resultant polymer was washed three times with acetone and further three times with water, and then dried, thereby obtaining a PSS resin (P5).

Evaluation of Corrosion-Inhibiting Effect and the Like

With 100 parts by weight of each of Polymer P2-P5, was dry-blended 1.0 part by weight of sodium orthomolybdate to determine the corrosion-inhibiting effect and other characteristics or properties in the same manner as in Example 1. The results are shown in Table 8.

TABLE 8

| Sample | Amount of sodium ortho-molybdate added (part) | Corrosion-inhibiting effect | $\eta^*/\eta^*0$ | $\eta^*15/\eta^*5$ | $\eta^*30/\eta^*5$ | $\Delta Tmc$ |
|---|---|---|---|---|---|---|
| P2 | 1.0 | A | 1.1 | 1.0 | 1.9 | −3.8 |
| | 0 | STD | STD | 1.8 | 11.1 | — |
| P3 | 1.0 | A | 0.8 | 0.8 | 0.9 | 0 |
| | 0 | STD | STD | 1.1 | 3.1 | — |
| P4 | 1.0 | A | — | — | — | — |
| P5 | 1.0 | A | — | — | — | — |

(Note)

(1) $\eta^*$ and $\eta^*_0$ were measured at 370° C.

(2) $\eta^*_5$, $\eta^*_{15}$ and $\eta^*_{30}$ are melt viscosities obtained by controlling the preheating time (retention time at 370° C.) to 5 minutes, 15 minutes and 30 minutes, respectively, upon the measurement of melt viscosity by means of a Capirograph. It is meant that the melt stability becomes better as the value of $\eta^*_{15}/\eta^*_5$ or $\eta_{30}/\eta^*_5$ comes nearer to 1.

As shown in Table 8, sodium orthomolybdate has an excellent corrosion-inhibiting effect, and moreover it is far from reducing the crystallization properties of the PAS resins; it has an effect of improving them (for example, $\Delta Tmc$ becomes a minus value in P2). In addition, it unexpectedly can also improve the melt stability to a notable extent.

What is claimed is:

1. A poly(arylene sulfide) resin composition comprising a poly(arylene sulfide) resin and, as a corrosion inhibitor, at least one substance selected from the group consisting of elemental molybdenum, oxoacids of molybdenum, sodium salt of and potassium salt of orthomolybdic acid, sodium salts of and potassium salts of isopolymolybdic acids, strontium salt of orthomolybdic acid, strontium salts of isopolymolybdic acids, basic calcium molybdates, zinc salts of the oxoacids of molybdenum, elemental tungsten, ammonium salts of the oxoacids of tungsten and zinc salts of the oxoacids of tungsten, said corrosion inhibitor being incorporated in a proportion within a range of 0.01–10 parts by weight per 100 parts by weight of the poly(arylene sulfide) resin.

2. The composition according to claim 1, wherein the corrosion inhibitor of molybdenum or tungsten is incorporated as a complex with zinc oxide and/or calcium oxide.

3. The composition according to claim 2, wherein the complex is basic zinc molybdate, basic zinc calcium molybdate or basic zinc molybdate phosphate.

4. The composition according to claim 1, further comprising the oxide of molybdenum or tungsten in addition to the alkali metal salt of the oxoacid of tungsten, sodium orthomolybdate or potassium orthomolybdate.

5. The composition according to claim 4, comprising sodium orthomolybdate and molybdenum oxide in combination.

6. The composition according to claim 1, wherein the poly(arylene sulfide) resin is a poly(phenylene sulfide) resin.

7. The composition according to claim 1, wherein the poly(arylene sulfide) resin is a poly(arylene ketone sulfide) resin.

8. The composition according to claim 1, wherein the poly(arylene sulfide) resin is a poly(arylene ketone ketone sulfide) resin.

9. The composition according to claim 1, wherein the poly(arylene sulfide) resin is a poly(arylene sulfone sulfide) resin.

10. The composition according to claim 1, wherein the poly(arylene sulfide) resin is a copolymer having p-phenylene sulfide recurring units and m-phenylene sulfide recurring units.

11. The composition according to claim 1, wherein the poly(arylene sulfide) resin is a copolymer having phenylene sulfide recurring units and arylene ketone sulfide recurring units.

12. The composition according to claim 1, wherein the poly(arylene sulfide) resin is a copolymer having phenylene sulfide recurring units and arylene ketone ketone sulfide recurring units.

13. The composition according to claim 1, wherein the poly(arylene sulfide) resin is a copolymer having phenylene sulfide recurring units and arylene sulfone sulfide recurring units.

14. The composition according to claim 1, wherein a ratio, $\eta^*/\eta^*_0$ of the melt viscosity, $\eta^*$ of the composition comprising the poly(arylene sulfide) resin and said at least one substance to the melt viscosity, $\eta^*_0$ of the poly(arylene sulfide) resin is within a range of 0.3–1.6, wherein the values of the melt viscosities are obtained by means of a Capirograph under the following conditions: (i) using a capillary having an internal diameter of 1 mm and an L/D of 10/1, (ii) presetting the measuring temperature to 310° C. for a PAS resin having no crystalline melting point or a crystalline melting point lower than 300° C., to 370° C. for a PAS resin whose crystalline melting point is not lower than 300° C., but lower than 365° C., or to a temperature higher than a crystalline melting point by 10° C. for a PAS resin whose crystalline melting point is not lower than 365° C., (iii) preheating for 5 minutes, and (iv) measuring at a shear rate of 1200/sec.

15. The composition according to claim 1, wherein an inhibitory degree of crystallization, $\Delta(Tmc)$ expressed by the following equation:

$$\Delta(Tmc)=[(Tmc)_0-(Tmc)]/(Tmc)_0 \times 100$$

is 15 or smaller, wherein (Tmc) is a melt crystallization temperature of the composition comprising the poly(arylene sulfide) resin and said at least one substance and $(Tmc)_0$ is a melt crystallization temperature of the poly(arylene sulfide) resin, and each of the melt crystallization temperature detected by means of a differential scanning calorimeter at a cooling rate of 10° C./min after about 10 mg of a resin sample are heated to 340° C. for a PAS resin whose crystalline melting point is lower than 300° C., to 400° C. for a PAS resin whose crystalline melting point is not lower than 300° C., but lower than 365° C., or to a temperature higher than a crystalline melting point by 20° C. for a PAS resin whose crystalline melting point is not lower than 365° C. in an inert gas atmosphere, and held for 1 minute at its corresponding heating temperature.

16. A poly(arylene sulfide) resin composition comprising 100 parts by weight of a poly(arylene sulfide) resin and 0.01–10 parts by weight of sodium orthomolybdate as a corrosion inhibitor.

* * * * *